(12) United States Patent
Suazo (10) Patent No.: US 8,733,710 B1
(45) Date of Patent: May 27, 2014

(54) CLAMP DISPLAY SYSTEM

(75) Inventor: Kenneth L. Suazo, Espanola, NM (US)

(73) Assignee: Marken Global, LLC, Espanola, NM (US)

(*) Notice: Subject to any disclaimer, the term of this patent is extended or adjusted under 35 U.S.C. 154(b) by 866 days.

(21) Appl. No.: 12/758,944

(22) Filed: Apr. 13, 2010

(51) Int. Cl.
*F21V 21/00* (2006.01)

(52) U.S. Cl.
USPC .......................................... 248/74.1; 248/73

(58) Field of Classification Search
USPC ......... 362/391; 248/63, 74.1, 65, 74.4, 309.1, 248/316.1, 689, 61, 294.1, 292.14, 291.1, 248/316.6, 67.7, 68.1, 73
See application file for complete search history.

(56) References Cited

U.S. PATENT DOCUMENTS

| | | | | |
|---|---|---|---|---|
| 2,657,442 | A * | 11/1953 | Bedford, Jr. | 248/74.2 |
| 5,510,579 | A * | 4/1996 | Hammer et al. | 174/168 |
| 6,340,238 | B1 | 1/2002 | Pan | |
| 6,342,138 | B1 * | 1/2002 | Brown | 204/297.09 |
| 6,347,780 | B1 | 2/2002 | Holbrook | |
| 6,477,744 | B1 * | 11/2002 | Miles | 24/3.12 |
| 6,614,908 | B1 * | 9/2003 | Huang | 379/446 |
| 6,883,768 | B1 | 4/2005 | Morin | |
| 7,309,150 | B2 | 12/2007 | Vendrick | |
| 7,418,097 | B2 * | 8/2008 | Chang | 379/446 |
| 2012/0104186 | A1 * | 5/2012 | Shirey et al. | 248/74.1 |

* cited by examiner

*Primary Examiner* — Steven Marsh
(74) *Attorney, Agent, or Firm* — Dennis F. Armijo; Ray R. Regan (57) ABSTRACT

The specification and drawing figures describe and illustrate a clamp display system for displaying one or more articles on being removably fastened to a structural element.

17 Claims, 10 Drawing Sheets

FIG.4B

CLAMP DISPLAY SYSTEM

FIELD OF TECHNOLOGY

The apparatus and method disclosed, illustrated and claimed in this document pertains generally to display systems. More particularly, the new and useful clamp display system solves the problem of displaying on a structural member of a structure an individual article or a plurality of interconnected articles by positioning the article or articles on one or more clamps that are removably mountable on a structural member.

BACKGROUND

Displays, seasonable or substantially permanent, are a recurring need, and are arrayed for others to view as attractive, interesting, entertaining, or informative, among other reasons. Individual and/or interconnected strings of articles such as lights, ornaments, political advertisements, general advertisements, and strings of interconnected letters forming words, are nonexclusive examples of such displays.

At least one example of one or more articles and/or interconnected articles that may be detachably secured to the clamp display system for decoration or advertising is a string or cord of interconnected light bulbs, whether fluorescent, incandescent, LED's, or other luminaries. Another example of articles and/or interconnected articles that may be detachably secured to the clamp display system of this document are individual or connected ornaments, lighted or unlighted, such as Fourth of July ornaments. Yet another nonexclusive example of articles and/or interconnected articles that may be detachably secured to the clamp display system are advertisements, which may range between general commercial advertisements and political advertisements, and may include, for example, a string of individual letters assembled to form one or more words.

In the absence of the availability of the clamp display system, such articles and/or interconnected articles might be attached to a structure or to a structural member with cellophane tape, fasteners such as nails and other means that penetrate or mar the structure or structural member, and which degrade the finish of the structure or structural member.

Although some effort has been exerted in the past to provide means for displaying such interconnected articles, most have proven too complicated, too costly, and difficult to install. Accordingly, an unsolved problem exists in connection with providing an apparatus and system to fasten to a structural member either individual or interconnected articles. More particularly, a need exists in the industry for a new and useful clamp display system that is capable of fastening to a structural member one or more articles, including articles interconnected to a string, cord and/or electrically activatable string (in this document, individually and collectively, a "cord") by positioning the article or articles on a plurality of clamps that are slidably and removably mountable on a member of the structure (in this document, a "structural member").

SUMMARY

The clamp display system disclosed, illustrated, and claimed in this document addresses the above-stated needs by providing a system that includes one or more clamps. The one or more clamps include opposing jaws that are expandable and contractable. The clamps are removably engageable with and mountable on a structural member without the need for fastening means that affect or mar the structural member.

In one aspect, a spring activated paddle assembly is included. The spring activated paddle assembly is rotationally mountable on the one or more clamps. The spring may be mounted on the paddle assembly or on at least one of the opposing jaws of the clamp. In another aspect, a paddle assembly rotationally movable on the one or more clamps by use of an elastic band. The paddle assembly is rotationally mountable in a slot formed in at least one of the opposing jaws. Means for detachably securing one or more articles to the paddle assembly is mounted on the paddle assembly and/or formed in or attached to an exterior face of an opposing jaw.

It will be apparent to one skilled in the art that the claimed subject matter as a whole, including the structure of the apparatus, and the cooperation of the elements of the apparatus, combine to result in a number of unexpected advantages and utilities. The structure and co-operation of structure of the clamp display system will become apparent to those skilled in the art when read in conjunction with the following description, drawing figures, and appended claims.

The foregoing has outlined broadly the more important features of the invention to better understand the detailed description that follows, and to better understand the contributions to the art. The clamp display system is not limited in application to the details of construction, and to the arrangements of the components, provided in the following description or drawing figures, but is capable of other embodiments, and of being practiced and carried out in various ways. The phraseology and terminology employed in this disclosure are for purpose of description, and therefore should not be regarded as limiting. As those skilled in the art will appreciate, the conception on which this disclosure is based readily may be used as a basis for designing other structures, methods, and systems. The claims, therefore, include equivalent constructions. Further, the abstract associated with this disclosure is intended neither to define the clamp display system, which is measured by the claims, nor intended to limit the scope of the claims. The novel features of the clamp display system are best understood from the accompanying drawing, considered in connection with the accompanying description of the drawing, in which similar reference characters refer to similar parts, and in which:

To the extent that the numerical designations in the drawing figures include lower case letters such as "a,b" such designations include multiple references, and the letter "n" in lower case such as "a-n" is intended to express a number of repetitions of the element designated by that numerical reference and subscripts.

DETAILED DESCRIPTION

Definitions

As used in this document the terms "expandable and contractable" modifying either the term clamp or the term "opposing jaws" means that the opposing jaws are made of a material capable of removably holding the clamps on a structural member on being formed or molded; the opposing jaws are made of a material allowing the opposing jaws to expand and contract a predetermined distance along an axis substantially perpendicular to the opposing jaws.

The term "interconnected articles" means and includes, as non-exclusive examples, a cord, string or comparable means (in this document, individually and collectively, a "cord") for interconnecting a plurality of articles, such as lights, decorations, and other articles. The term includes, therefore, in addition to lights and decorations on an electrically activatable cord of lights at least letters that may be assembled into words for greetings, signs, announcements and similar articles.

The term "means for detachably securing the interconnected sequence of articles" means at least a hook, holder, clasp, slotted member, anchor, and hook-and-loop material, among similar means for placing an article or an interconnected series of articles on the rotationally movable paddle of the paddle assembly of an individual clamp or a plurality of clamps.

The term "structure" means a construction, building, bridge, framework, or any other object put together from many different parts; and the term "structural member" means a distinct part of a structure including, but not limited to, a beam, facia, eave, fence member, wall or similar structural unit of a building or other construction.

DESCRIPTION

As illustrated in FIGS. 1-4B, a clamp display system is provided that in its broadest context includes a plurality of clamps. The plurality of clamps is formed with opposing jaws. At least one of the plurality of opposing jaws is formed with a slot. A paddle assembly is included that is rotationally mountable in the slot. In addition, means for detachably securing one or more articles to the paddle is provided. In one aspect a spring is positioned on the clamp display system in such a way as to allow repositionable rotation of the paddle assembly during operation of the clamp display system, and in another aspect an elastic band is positioned on the clamp display system in such a way as to allow repositionable rotation of the paddle assembly during operation of the clamp display system.

Figure 1:
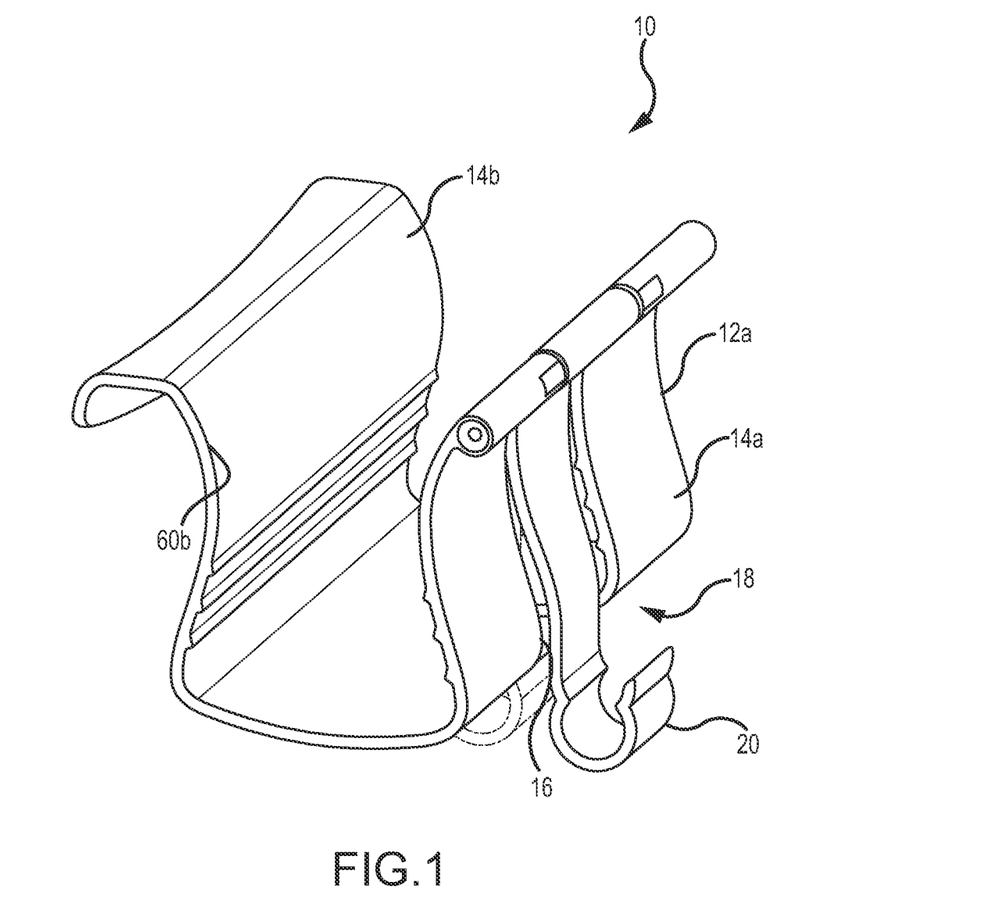
FIG. 1 of the drawing is a perspective view of one aspect of the clamp display system.
Figure 2A:
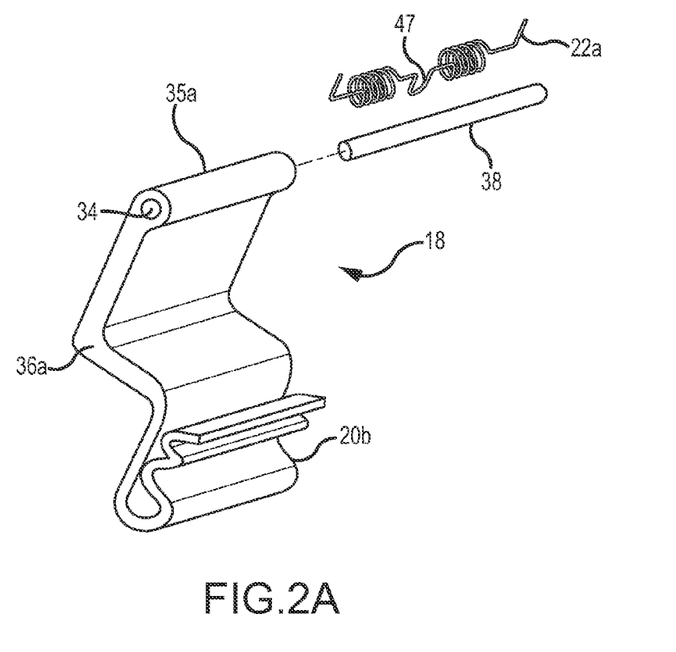
FIG. 2A illustrates one aspect of the paddle assembly of the clamp display system.
Figure 3A:
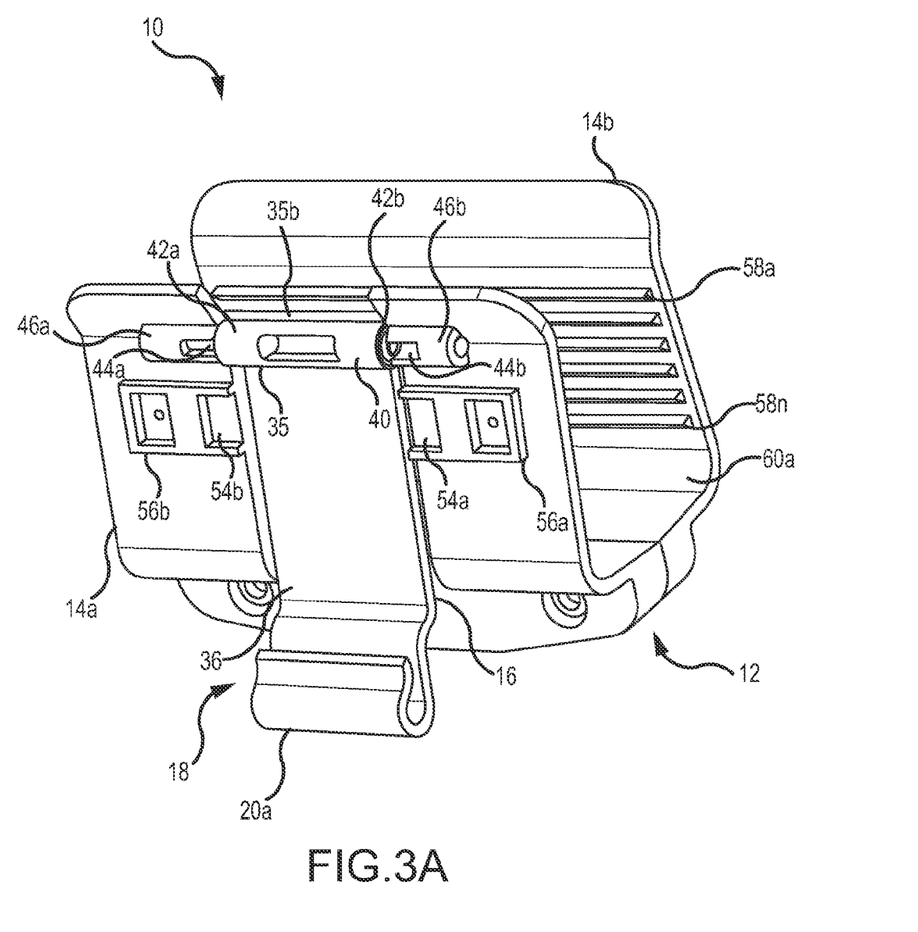
FIG. 3A is a perspective figure illustrating another aspect of the clamp display system.
Figure 3B:
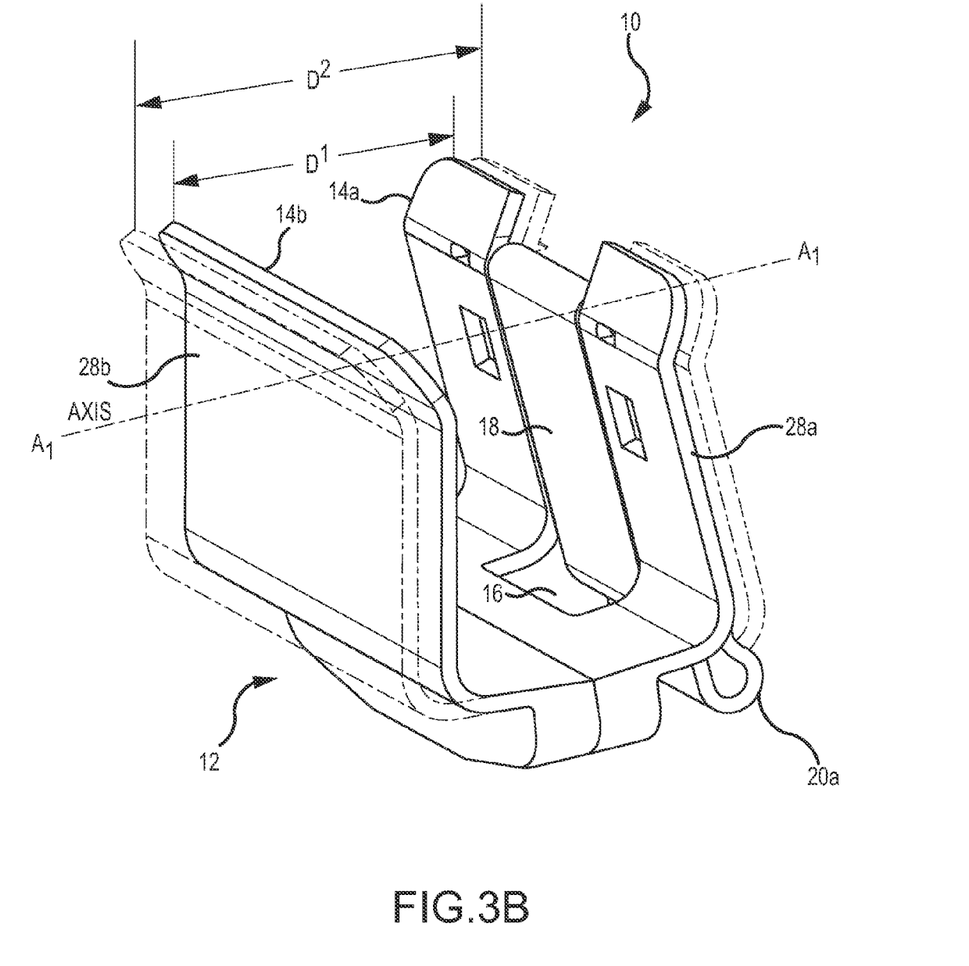
FIG. 3B illustrates the aspect of the clamp display system in FIG. 3A from a reverse perspective.
Figure 3C:
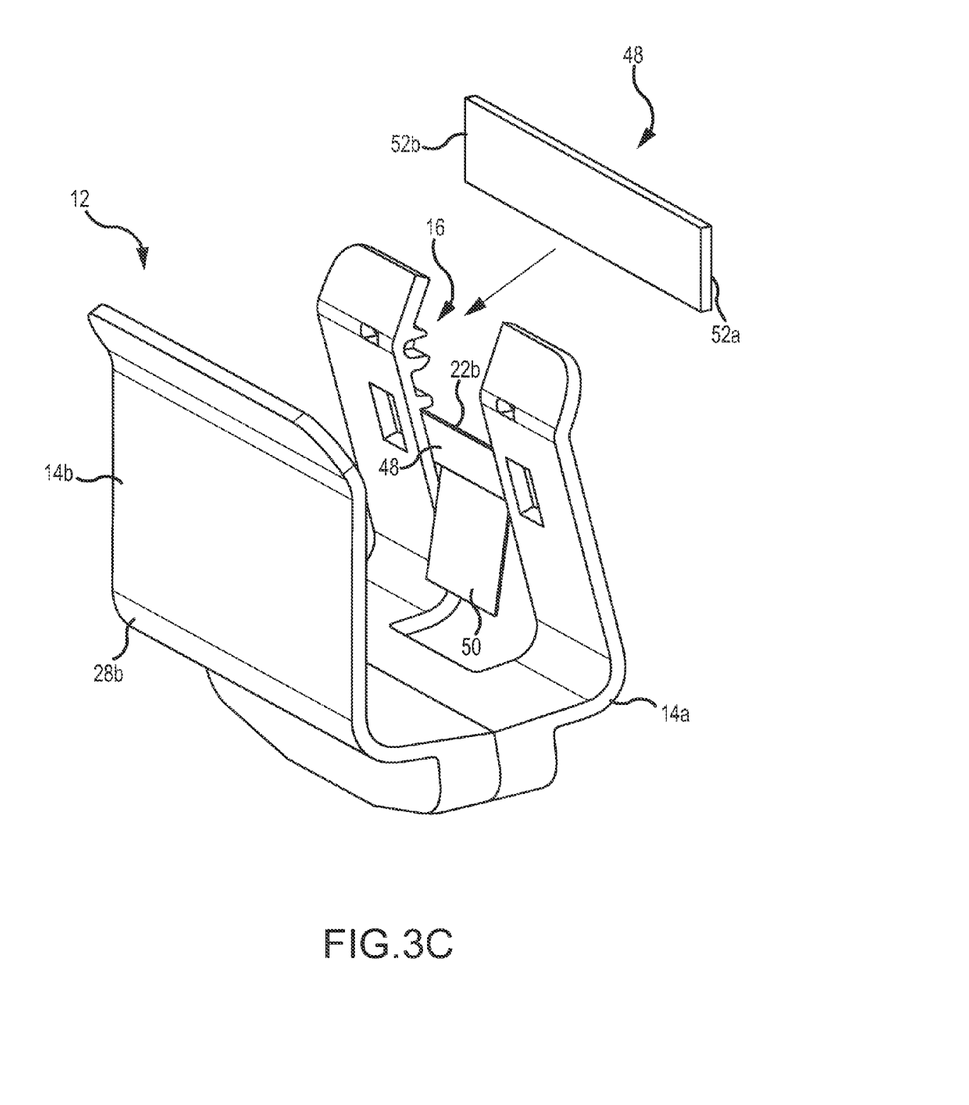
FIG. 3C is a perspective figure illustrating another aspect of the paddle assembly.
Figure 3D:
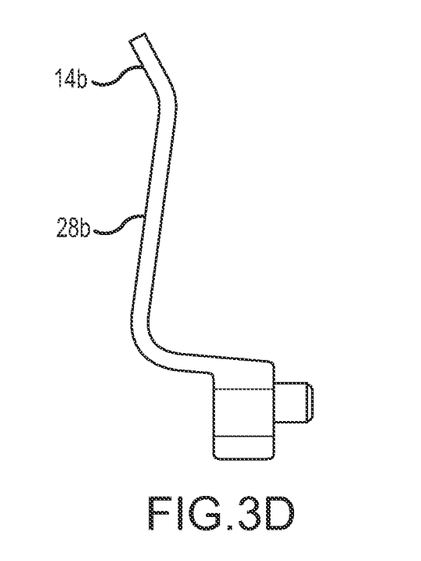
FIG. 3D is a side view of a paddle of the clamp display system.
Figure 3E:
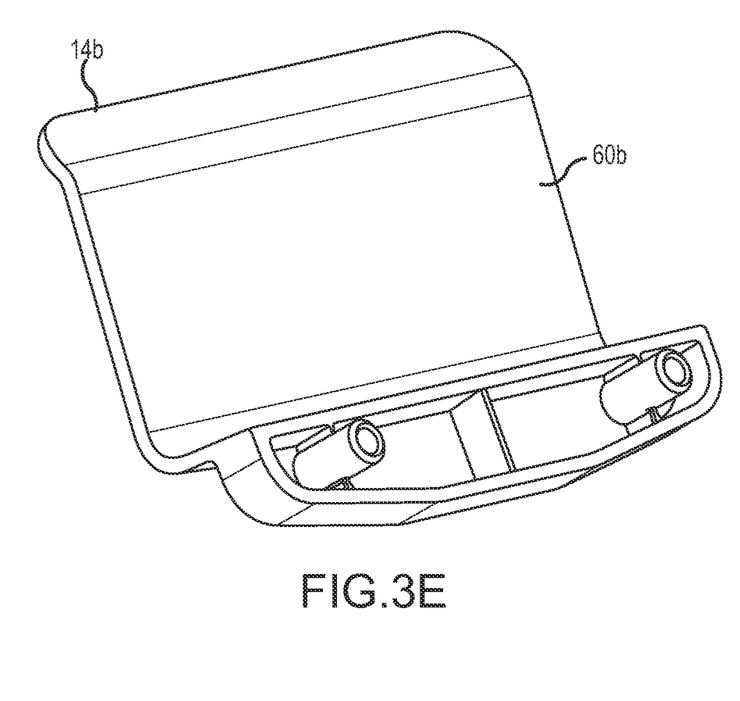
FIG. 3E is a perspective view of one of the opposing jaws of the clamp display system illustrated in FIG. 3A.
Figure 3F:
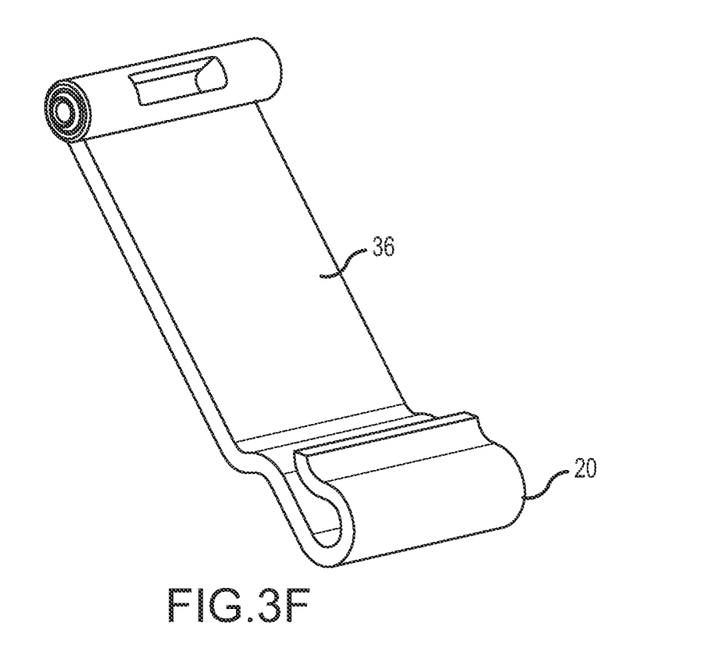
FIG. 3F is a perspective view of a paddle of the clamp display system.
Figure 3G:
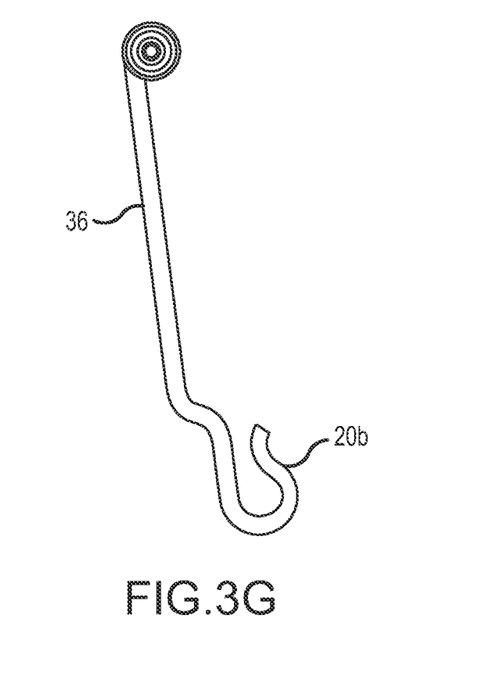
FIG. 3G is a side view of a paddle of the clamp display system illustrated in FIG. 3A.
Figure 3H:
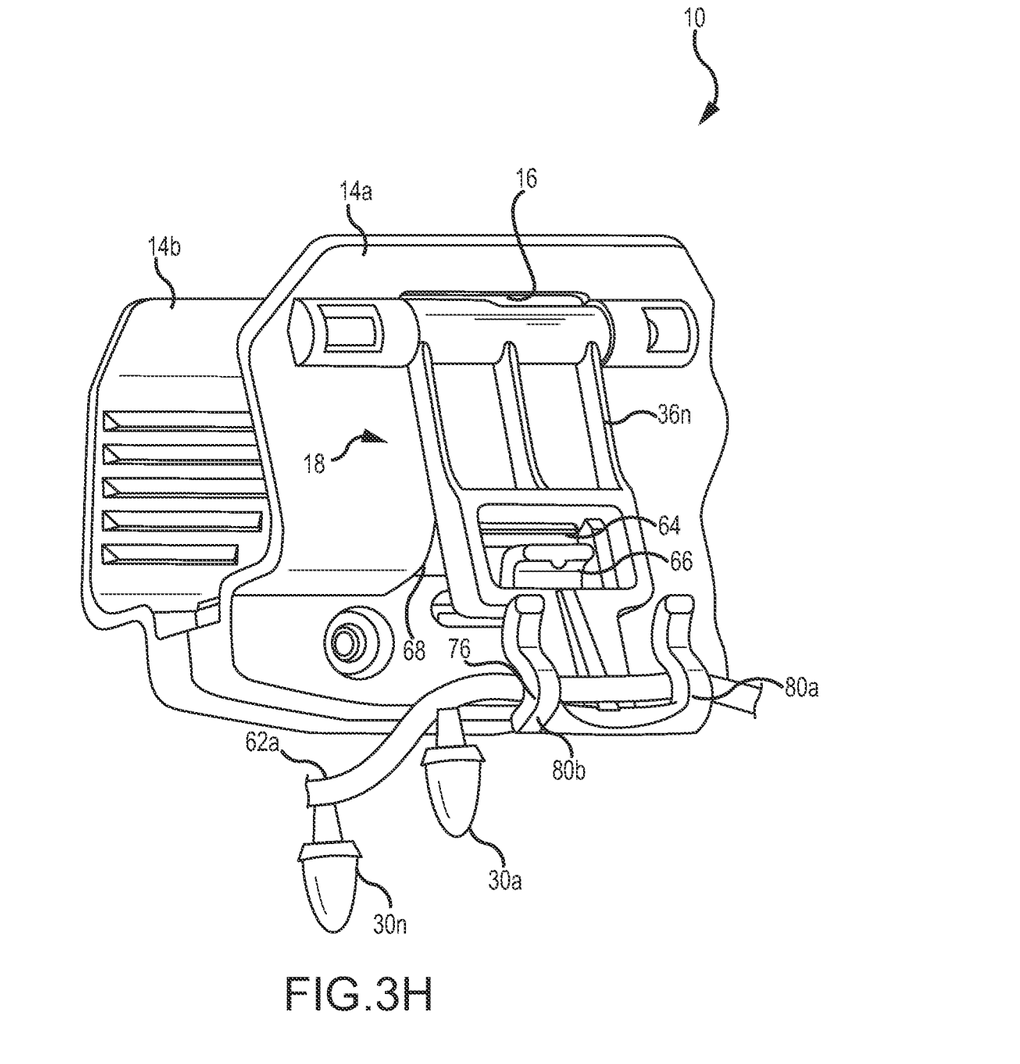
FIG. 3H is a perspective view of another aspect of the clamp display system.
Figure 3I:
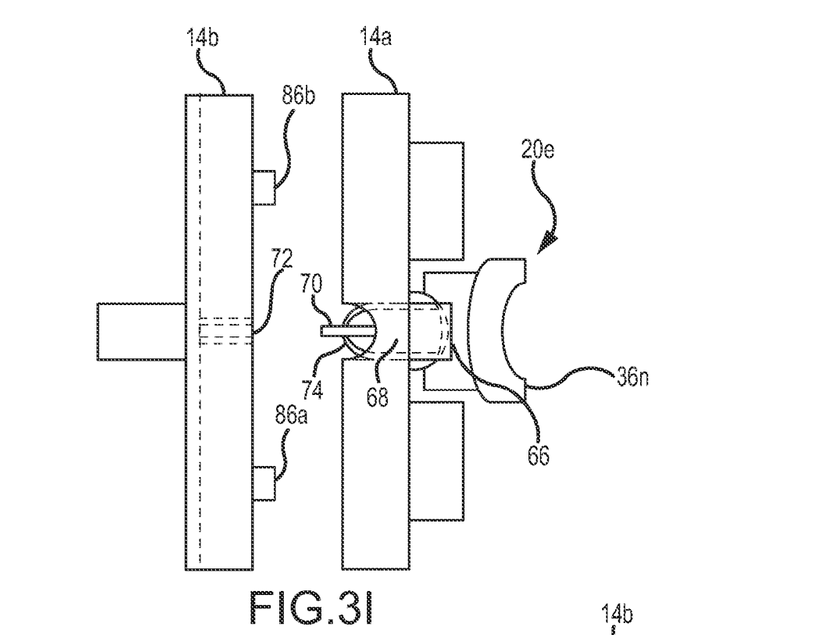
FIG. 3I is a bottom view of the opposing jaws of the clamp display system illustrated in FIG. 3H.
Figure 3J:
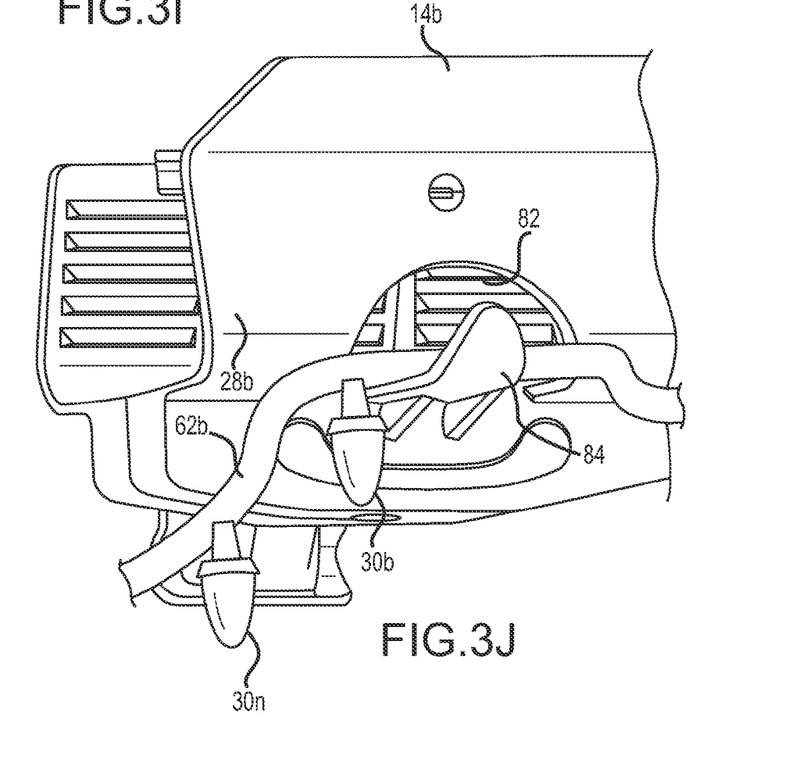
FIG. 3J is a perspective view of the void and arm of the aspect of the clamp display system illustrated in FIG. 3H.

More specifically, as illustrated by cross-reference between FIGS. 1-3J, a clamp display system 10 includes a plurality of clamps 12$a,n$ as illustrated in FIGS. 1, 3A-3C, and 3H-3J. The plurality of clamps 12$a,n$ is formed with opposing jaws 14$a,b$ as also illustrated by cross-reference between FIGS. 1, 3A-3C, and 3H-3J. At least one of the plurality of opposing jaws 14$a,b$ is formed with a slot 16 as illustrated in FIG. 1. A paddle assembly 18 as illustrated by cross-reference between FIGS. 1, 3A-3C, and 3H-3J is included. The paddle assembly 18 is rotationally mountable in the slot 16. In addition, means 20 for detachably securing one or more articles to the paddle is provided as illustrated by cross-reference between FIGS. 1, 3A-3C, and 3H-3J. In one aspect of clamp display system 10 a spring 22$a,b$ is positioned on the clamp display system 10 as illustrated by cross-reference between FIGS. 1, 2A and 3A-3C in such a way as to allow repositionable rotation of the paddle assembly 18 during operation of the clamp display system 10. In another aspect of clamp display system 10 an elastic band 74, as illustrated by cross-reference between FIGS. 3H-3J is positioned on the clamp display system 10 in such a way as to allow repositionable rotation of the paddle assembly 18 during operation of the clamp display system 10.

Figure 4A:
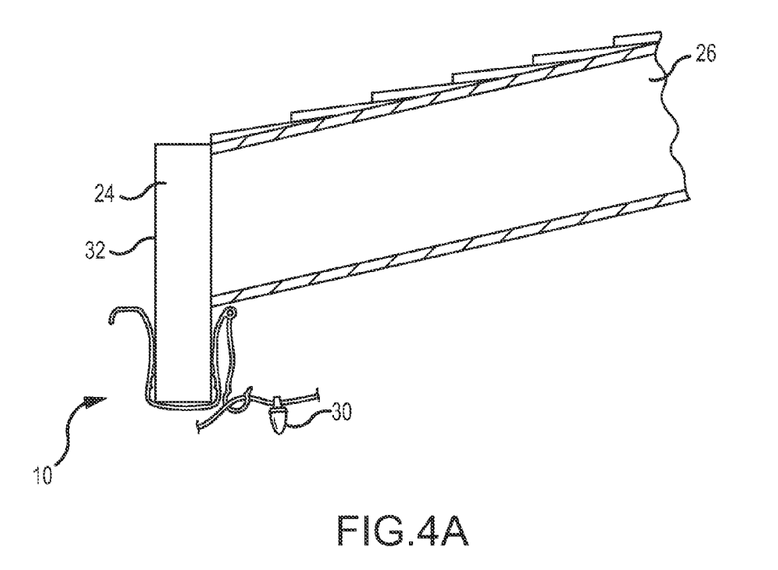
FIG. 4A is an end view of a structural member on which one clamp of the clamp display system has been installed.
Figure 4B:
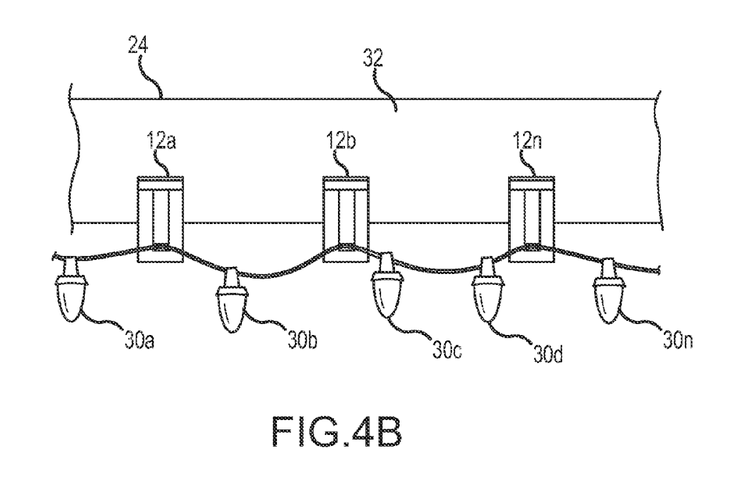
FIG. 4B is a front view of a structural member on which a plurality of clamps of the clamp display system has been installed and on which a plurality of interconnected articles have been positioned.

Referring to FIG. 1, in one aspect the opposing jaws 14$a,b$ are made from a material that is expandable and contractible. As a consequence, the opposing jaws 14$a,b$ are capable of removably holding one or more clamps 12$a,n$ on a structural member 24 of a structure 26 as shown also by cross-reference between FIGS. 4A and 4B. The opposing jaws 14$a,b$ may be separated prior to installation on a structural member 24 in an at-rest position to assist in positioning the one or more 12$a,n$ on a structural member 24, and to avoid marring the finish of structural member 24. When removed from structural member 24, opposing jaws 14$a,b$ return to a predetermined at-rest position $D^1$ as illustrated by cross-reference between FIGS. 3A-3C, and more specifically in FIG. 3B. During operation, on installation of the clamp display system 10 on a structural member 24 of a structure 26, as illustrated in FIGS. 4A-4B, the opposing jaws 14$a,b$ expand along an axis $A_1$-$A_1$ substantially perpendicular to the exterior face 28$a,b$ of opposing jaws 14$a,b$. Such an axis $A_1$-$A_1$ is illustrated in FIG. 3B for illustrative purposes. As illustrated, opposing jaws 14$a,b$, when removably mounted on a structural member 24, may expand to a distance $D^2$ as also illustrated in FIG. 3B. Thus, opposing jaws 14$a,b$ are substantially flexible and expandable, and also contractible, allowing the opposing jaws 14$a,b$ to return to an at-rest state when one or more of the plurality of clamps 12$a$-$n$ is removed from a structural member 24. As a person skilled in the art will appreciate, opposing jaws 14$a,b$ may be made either of a single material or of composite materials such as two or more constituent materials.

As also illustrated in FIG. 1, a clamp display system 10 may be an apparatus formed monolithically for displaying at least one article 30$a$-$n$ as illustrated by cross-reference between FIGS. 4A-4B. In another aspect of the clamp display system 10, as shown by cross-reference between FIGS. 3A-3C, component parts of a clamp display system 10 may be formed using a variety of molding methods and assembled as shown by cross reference between FIGS. 3A-3G. A polymer matrix or resin solution may be used to form at least the opposing jaws 14$a,b$ of the plurality of clamps 12$a$-$n$ of the clamp display system 10 illustrated by cross-reference between FIGS. 3A-3G. Materials that may be used in the manufacture of all or a portion of a plurality of clamps 12$a$-$n$ include polyester, vinylester, polypropylene, and PEEK, among others. Accordingly, the clamp display system 10, and in particular the plurality of clamps 12a-n, may be formed by injection molding from a thermoplastic like Nylon®, polyethylene, and/or polyvinylchloride. Consequently, in operation, opposing jaws 14a,b expand to enable inner faces 60a,b to exert pressure on a structural member 24 to overcome the force of gravity, and to hold the plurality of clamps 12a-n on a structural member 24. The clamp display system 10 thus adds to the art by providing a system wherein the plurality of clamps 12a-n is slidably and removably engageable on a structural member 24 without use or deployment of a fastening means that might alter the structural member, or penetrate the exposed surface 32 of structural member 24 when one or more articles 30a-n are removably positioned on one or more clamps 12a-n.

As illustrated by cross-reference between FIGS. 1-3C and 3F-3J, the clamp display system 10 includes the paddle assembly 18. Paddle assembly 18 is rotationally mountable in the slot 16. In one aspect of clamp display system 10, as illustrated by cross-reference between FIGS. 2A-2B, paddle assembly 18 includes a tube 34 formed in one end 35a of the paddle 36 that is demountably attachable to at least one of the opposing jaws 14a,b. As also illustrated in FIG. 2A, in one aspect of the clamp display system 10, an axle 38 is insertable through tube 34 to provide for rotational movement of the one end 35a of the paddle 36 during operation of paddle assembly 18. In another aspect, however, as illustrated in FIG. 3A, neither a tube 34 nor an axle 38 is provided. Instead, a barrel 40 is formed in one end 35b of paddle 36, and is also demountably attachable to the slot 16 formed in one of the opposing jaws 14a, by including opposing rims 42a,b that are demountably attachable through opposing openings 44a,b in opposing barrel receptacles 46a,b.

Figure 2B:
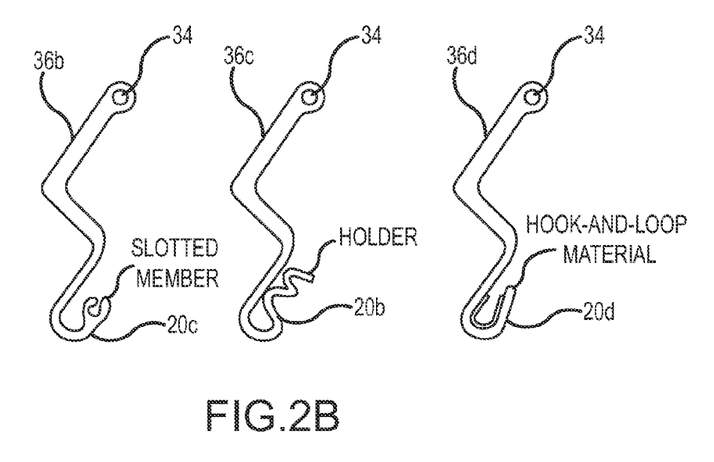
FIG. 2B illustrates a variety of means for detachably securing one or more articles to the paddle of the paddle assembly.

As illustrated by cross-reference between FIGS. 1, 3A-3C and 3H-3J, means 20a-n for detachably securing one or more articles to the paddle 36 or paddle assembly 18 also is provided. Any number of means 20a-n for detachably securing one or more articles 30a-n to the paddle 36 may be placed in operation. Such means 20a-n for detachably securing one or more articles to the paddle 36 may be provided in all aspects of the clamp display system 10. Accordingly, as shown for illustrative purposes in only one drawing figure, as illustrated in FIGS. 2A-2B, such non-exclusive examples of means 20 for detachably securing one or more articles to the paddle 36 include a hook 20b, slotted member 20c, and hook-and-loop material 20d such as Velcro®.

As indicated above, the clamp display system 10 illustrated by cross-reference between FIGS. 1-3C includes a spring 22a capable of repositionably rotating the paddle 36 of paddle assembly 18 in slot 16. In one aspect of such a spring, as illustrated in FIG. 2A, a coil spring 22a is provided. As illustrated, coil spring 22a is shaped and dimensioned for slidable engagement with axle 38 that also is inserted through coil spring 22a. Coil spring 22a includes a coil spring extension 47 as illustrated in FIG. 2A to assist in repositioning paddle 36 of paddle assembly 18 in slot 16 one repositionably mounting paddle assembly 18 on opposing jaw 14a. As a person skilled in the art will appreciate, a coil spring 22a is sometimes known as a helical spring, and is a mechanical device typically used to store energy and subsequently to release the stored energy, and/or to maintain a force between contacting surfaces. As a person skilled in the art also will appreciate, coil spring 22a also is sometimes referred to as a torsion spring.

In another aspect of a spring used to activate rotational motion of paddle 36 in slot 16, as illustrated by cross-reference between FIGS. 3A and 3C, a plate spring 48 is included with the clamp display system 10 and installed adjacent the slot 16 in such a way as to repositionably rotate the paddle 36 of paddle assembly 18. As illustrated by cross-reference between FIGS. 3A-3C, plate spring 48 may be formed with a tongue 50. In operation, plate spring 48 in combination with tongue 50 also permits repositionable rotation of the paddle 36 of paddle assembly 18 during operation. In operation, plate spring 48 and tongue 50, in combination with the expandable and contractible opposing jaws 14a,b, contribute to compressively clutching the plurality of clamps 12a-n onto a structural member 24 of a structure 26, as will be evident to a person of skill in the art. As further illustrated by cross reference between FIGS. 3A-3C, and in particular FIG. 3C, plate spring 48 is mountable on the exterior face 28a of an opposing jaw 14a by inserting opposing flanges 52a,b of plate spring 48 into plate spring sleeves 54a,b of opposing plate spring mounting brackets 56a,b. As a person skilled in the art will appreciate, a "plate spring" sometimes is referred to as a flat spring, and is made of a variety of materials depending on desired deflection of the plate spring during operation. Such materials include high-carbon spring steel, phosphor-bronze, stainless steel, and others.

As illustrated by cross reference between FIGS. 1 and 3A, to enhance the compressible clutching of the opposing jaws 14a,b, a plurality of fins 58a-n may be formed on the inner face 60a,b of opposing jaws 14a,b.

As illustrated by cross-reference between FIGS. 3H-3J, another aspect of clamp display system 10 adapted to display a plurality of articles 30a-n attached to a cord 62a,b is illustrated. As shown, a plurality of clamps 12a-n having opposing jaws 14a,b adapted to be removably mounted on a structural member 24 is provided. In addition, a paddle assembly 18 that is rotationally mountable on at least one of the opposing jaws 14a is capable of detachably securing the cord 62a to the clamp display system 10. Also included are means 20e connectable to the paddle assembly 18 for repositionably rotating the paddle assembly 18 and for detachably securing the plurality of articles 30a-n to the clamp display system 10.

As also illustrated by cross-reference between FIGS. 3H-3J, the paddle assembly 18 includes a paddle 36n. Paddle 36n is rotationally mountable in a slot 16 formed in the first jaw 14a of the opposing jaws 14a,b. The paddle 36n further comprises an aperture 64 formed in the paddle 36. In addition, an elbow 66 is formed in the aperture. In addition, a notch 68 is formed in the first jaw 14a of the opposing jaws 14a,b. The notch 68 is adjacent the aperture 64. Another structural component is provided as illustrated, a bridge 70. Bridge 70 is adjacent the notch 68. The bridge 70 is secured in a hollow lumen 72 on assembly of opposing jaws 14a,b of the clamp display system 10. An elastic band 74 is provided. The elastic band 74 is stretchable and resilient. In one aspect of the elastic band 74, it is a closed loop such as an o-ring, but neither the shape nor structure of an o-ring is a limitation of this aspect of the clamp display system 10. Because the elastic band 74 is stretchable and resilient, the elastic band 74 is removably connectable to the bridge 70 and to the elbow 66 as a person skilled in the art will appreciate. In operation, the elastic band 74 allows paddle 36n to rotational move and pivot to help mount a clamp 12a-n on a structural member 24 and to assist in positioning and repositioning a plurality of article 30a-n that are attached to a cord 62a on the clamp display system 10.

The paddle 36 of this aspect of the clamp display system 10 includes a ledge 76. Also included is a rib 78 that extends substantially perpendicular from the ledge 76. In operation, rib 78 forms a curved shape in cord 62a at the point of contact between rib 78 and the point of contact on cord 62a, which permits a user to snug the cord 62a against rib 76, thus contributing to detachably securing cord 62a on clamp display system 10. In addition, at least one hook 80a,b extends substantially vertically from the ledge 76 and is shaped to hold cord 62a, thus also contributing to detachably securing the cord 62a on the clamp display system 10. As illustrated, the at least one hook 80a,b is an S-shaped hook, but neither the shape nor structure of the at least one hook 80a,b is a limitation of this aspect of the clamp display system 10.

As also illustrated perhaps best in FIG. 3J, the clamp display system 10 also includes a void 82 formed in the second jaw 14b of the opposing jaws 14a,b. An arm 84 is formed in the void 82 that extends substantially perpendicular from the exterior face 28b of the second jaw 14b of the opposing jaws 14a,b. In operation, the combination of the void 82 and the arm 84 provide another device for holding a plurality of articles 30a,n. In at least one aspect, the plurality of articles 30a,n is a plurality of lights.

As a person skilled in the art will appreciate, opposing jaws 14a,b, which are illustrated in FIG. 3I as separated for illustrative purposes, are connected together during operation. Any number of means for connecting together opposing jaws 14a,b may be used. Connector receptors 86a,b are shown in FIG. 3I for illustrative purposes. Connector receptors 86a,b may receive screws (not shown) or snap-together extensions mounted on one of the opposing jaws 14a (not shown), as a person skilled in the art will appreciate.

Claim elements and steps in this document have been numbered solely as an aid in understanding the description. The numbering is not intended to, and should not be considered as intending to, indicate the ordering of elements and steps in the claims. In addition, the clamp display system 10 shown in drawing FIGS. 1 through 4B shows more than one aspect of the clamp display system 10, none of which is intended to be exclusive, but merely illustrative of the disclosed aspects and embodiments.

Means-plus-function clauses in the claims are intended to cover the structures described as performing the recited function that include not only structural equivalents, but also equivalent structures.

What is claimed is:

1. An apparatus for displaying at least one article, comprising:
    a plurality of clamps formed with opposing jaws,
        wherein at least one of the plurality of opposing jaws is formed with a slot;
    a paddle assembly rotationally mountable in the slot;
    means for detachably securing one or more articles to a paddle; and
    an rotational motion assembly positioned on the apparatus in such a way to repositionably rotate the paddle assembly comprising an elastic band removably connectable to a bridge disposed on an opposing jaw and to an elbow disposed on the paddle.

2. An apparatus for displaying at least one article as recited in claim 1, wherein the opposing jaws are made from an expandable and contractible material.

3. An apparatus for displaying at least one article as recited in claim 1, wherein the opposing jaws are expandable and contractible a predetermined distance along an axis that is substantially perpendicular to the exterior face of the opposing jaws.

4. An apparatus for displaying at least one article as recited in claim 1, wherein the opposing jaws are capable of exerting pressure on a structural member to overcome the force of gravity.

5. An apparatus for displaying at least one article as recited in claim 1, wherein the plurality of clamps is slidably and removably engageable on a structural member without use of fastening means that alter or penetrate the structural member.

6. An apparatus for displaying at least one article as recited in claim 1, wherein the means for detachably securing one or more articles to the paddle includes means selected from the group of securing means consisting of a hook, holder, clasp, slotted member, anchor, and hook-and-loop material.

7. An apparatus for displaying at least one article as recited in claim 1, wherein the rotational motion assembly is further adapted to compressively clutch the clamp on a structural member.

8. A device for displaying a plurality of articles attached to a cord, comprising:
    a plurality of clamps having opposing jaws adapted to be removably mounted on a structural member;
    a paddle assembly rotationally mountable on at least one of the opposing jaws, the paddle assembly adapted to detachably secure the cord to the device; and
    means connectable to the paddle assembly for repositionably rotating the paddle assembly comprising an elastic band removably connectable to a bridge disposed on an opposing jaw and to an elbow disposed on a paddle and for detachably securing the plurality of articles to the device.

9. A device for displaying a plurality of articles attached to a cord as recited in claim 8, wherein the paddle further comprises an aperture formed in the paddle, and further wherein the elbow is formed in the aperture.

10. A device for displaying a plurality of articles attached to a cord as recited in claim 9, further comprising a notch formed in the first jaw of the opposing jaws adjacent the aperture.

11. A device for displaying a plurality of articles attached to a cord as recited in claim 10, wherein the bridge is adjacent the notch.

12. A device for displaying a plurality of articles attached to a cord as recited in claim 8, wherein the paddle further comprises a ledge.

13. A device for displaying a plurality of articles attached to a cord as recited in claim 12, further comprising a rib extending substantially perpendicular from the ledge.

14. A device for displaying a plurality of articles attached to a cord as recited in claim 13, further comprising at least one S-shaped hook extending substantially vertically from the ledge adapted to removably secure the cord.

15. A device for displaying a plurality of articles attached to a cord as recited in claim 8, further comprising a void formed in the second of the opposing jaws.

16. A device for displaying a plurality of articles attached to a cord as recited in claim 15, further comprising an arm formed in the void that extends substantially perpendicular from the exterior surface of the second of the opposing jaws.

17. A device for displaying a plurality of articles attached to a cord as recited in claim 8, wherein the plurality of articles is a plurality of lights.

* * * * *